US012324069B2

(12) United States Patent
Frey et al.

(10) Patent No.: US 12,324,069 B2
(45) Date of Patent: Jun. 3, 2025

(54) LIGHT SYSTEM

(71) Applicant: Melexis Technologies NV, Tessenderlo (BE)

(72) Inventors: Michael Frey, Erfurt (DE); Jorgen Sturm, Erfurt (DE); Thomas Freitag, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 0 days.

(21) Appl. No.: 18/165,672

(22) Filed: Feb. 7, 2023

(65) Prior Publication Data

US 2023/0254959 A1 Aug. 10, 2023

(30) Foreign Application Priority Data

Feb. 8, 2022 (EP) ..................................... 22155588

(51) Int. Cl.
*H05B 45/50* (2022.01)
*H05B 47/17* (2020.01)
*H05B 47/18* (2020.01)

(52) U.S. Cl.
CPC ............. *H05B 45/50* (2020.01); *H05B 47/17* (2020.01); *H05B 47/18* (2020.01)

(58) Field of Classification Search
None
See application file for complete search history.

(56) References Cited

U.S. PATENT DOCUMENTS

| | | | | |
|---|---|---|---|---|
| 6,331,756 | B1 | 12/2001 | Belliveau | |
| 9,912,143 | B1 * | 3/2018 | Hogan | H02H 3/05 |
| 11,102,861 | B1 * | 8/2021 | Zolotykh | H05B 45/40 |
| 2005/0093461 | A1 * | 5/2005 | Cull | H05B 41/46 315/149 |
| 2008/0074280 | A1 | 3/2008 | Batchelor et al. | |
| 2015/0102727 | A1 * | 4/2015 | Chen | H05B 45/12 315/159 |
| 2015/0189712 | A1 * | 7/2015 | Van Endert | H05B 47/165 315/161 |

FOREIGN PATENT DOCUMENTS

| | | |
|---|---|---|
| EP | 2680669 A1 | 1/2014 |
| FR | 3018988 A1 | 9/2015 |

OTHER PUBLICATIONS

Search Report from corresponding European Application No. 22155588.1, Aug. 1, 2022.

* cited by examiner

*Primary Examiner* — Anh Q Tran
(74) *Attorney, Agent, or Firm* — Workman Nydegger

(57) ABSTRACT

A safety related light system includes: one light source, a first control circuit, and a second control circuit. One of the first control circuit or the second control circuit is selectively enabled to operate in a drive mode to operate the one light source.

19 Claims, 5 Drawing Sheets

LIGHT SYSTEM

TECHNICAL FIELD

The invention concerns a safety related light system, in particular a light system for driving light emitting diodes, LEDs, in a redundant manner.

BACKGROUND

Nowadays the traditional light bulb is ever so often exchanged by LED technology. Not only because of the better energy efficiency, but also because of their improved brightness and reduced space requirements.

In modern vehicles, the traditional head-, tail-, and/or fog-lights are often already implemented by LED technology. The same is also true for interior lights within the vehicle itself. Even warning lights become nowadays powered by LED technology.

However, not only the automotive sector is using LED technology, but also other sectors where a status of a system or process is indicated by ease of light systems.

Since some of these light systems have a safety related feature, their operation must not be impaired by failures. Failures may occur due to loss of connections, either of connections to the LEDs due to wear out of soldering connections or a control circuit may be disconnected from a bus such that it is not controllable anymore by a controller.

In order to be able to cope with such failures, modern systems are provided in a redundant manner. This means two identical systems are independently provided. Both light systems provide identical functionality. Only one light system is operational at a given time, whereas the other light system is used as backup or redundant light system which takes over once the other light system fails. Such redundant light systems can for example be seen in FR3018988A1 and are depicted in FIG. 1 of the current application.

However, having to have two identical light systems has not only the drawback of increased costs, but also requires a lot of space. In some applications the space just might not be available for redundant systems, which then consequently impairs safety. Furthermore, failures may occur which prevent the failed system to switch OFF, in this case also the redundant light system cannot take over, since it cannot switch OFF the other light system, since they are independent. In this case dangerous situations may arise.

Therefore, a need exists to provide a light system with which the aforementioned drawbacks can be overcome. Hence one which uses less space than a fully redundant system and at the same time is able to still drive the light source into a safe state, for example maintain a specific colour and/or brightness, or safely switch OFF the light source, even if one control circuit fails.

SUMMARY

This need is fulfilled by the safety related light system according to the current invention. The light system according to the current invention comprises one light source, a first control circuit and a second control circuit, both control circuits are connected to the one light and one of the control circuits is selectively enabled to operate in a drive mode. The control circuit which operates in the drive mode may control or regulate the power supplied to the one light source. It can also be said that the one control circuit which is in the drive mode operates the one light source. It can also be said that the control circuit who is in the drive mode has its drive mode enabled. The control circuit in the drive mode may thereby be able to control or regulate the power supplied to the one light source. Thereby, the power supplied to the one light source may be done by the control circuit in the drive mode itself, such that the respective control circuit not only controls or regulates the power supplied, but also supplies the power. In this case it can be said that the respective control circuit is not only operating in the drive mode, but also in a supply mode. Alternatively, the power may also be supplied by the control circuit not in the drive mode, whereas the control circuit in the drive mode controls or regulates the power supplied. In this case it can be said that the control circuit not in the drive mode operates in the supply mode. The power supply may however also be independent from the control circuits and the control circuit in the drive mode may only control or regulate the respective power supplied. Hence, the control circuits may either possess the ability to provide the one light source themselves with power or may be able to control or regulate a power source to provide the one light source with power.

Hence, the light system of the current invention provides one light source, which is mutually exclusive driven by one of the two control circuits. In other words, the system according to the invention comprises one light source which is either driven by the first control circuit or the second control circuit. This means both control circuits possess the ability and functionality to drive the one light source equally. As such the control circuits are exchangeable. It can also be said that the one light source is dependent upon the two control circuits.

Furthermore, the control circuit in the drive mode may not only operate the one light source, but also may diagnose the one light source. In addition, the control circuit in the drive mode may diagnose the respective other control circuit. The latter is advantageous, when one control circuit provides the power to the one light source and the other control circuit controls or regulates the power supplied. The control circuit not in the drive mode may also diagnose the one light source and/or the control circuit in the drive mode. Diagnose may thereby mean that it is determined whether the one light source and/or the control circuit operate under nominal conditions. Consequently, the full diagnostic redundancy is realized by only partial hardware redundancy. In other words, the hardware is only partially redundant, but still the light system provides full diagnostic functionality.

Once a failure is detected, the drive mode and/or the supply mode can be enabled in that respective control circuit which can still perform the respective functionality. For example, if one control circuit is in the drive mode and a failure occurs within this control circuit, the other control circuit can take over the drive mode.

The same applies also to the supply mode, if one control circuit's ability to operate in the supply mode malfunctions, the other can take over. This may even cause situations in which one control circuit takes over the drive mode as well as the supply mode.

Furthermore, the same applies to the diagnostic mode. As long as a control circuit is still able to perform diagnostic functionality of the at least one light source and/or the respective other control circuit, the control circuit will still do so in order to provide diagnostic information about the light system.

Depending upon the severity of the failure, the control circuit which operation fails may also completely switch OFF or being switched OFF in order not to cause any damage and to ensure that the one light source is always driven in the correct state. For this purpose, at least one gate circuit may be present which is adapted to completely separate the respective control circuit from the one light source.

The selective enabling/disabling of a control circuit respectively of its drive mode may be done by a controller. The controller may send a control command to the respective control circuit to enable/disable the drive mode. The same also applies to the supply mode, which can also be enabled or disabled by the controller. Furthermore, if a failure is too severe, the controller may also switch OFF the malfunctioning control circuit in order that it does not cause any damage and to ensure that the one light source is always driven in the correct state.

This allows for the first time to have a light system which is fully redundant in functionality, but only partially redundant in hardware. This not only saves costs, but also space. Due to the fact that both control circuits are able to control the very same light source, it is also possible that even if one control circuit fails, the one light source can properly be operated, for example be switched OFF, which would not be possible in the redundant system according to the prior art in which independent light sources are separately controlled.

In a preferred embodiment of the invention, the first and second control circuits are identical. This means both control circuits comprise the same software and/or hardware components. The two control circuits may also comprise the same input and output ports. It shall be understood that same input and output ports only means that both control circuits at least comprise one port for a connection to a bus lane to transmit and/or receive signals and at least one port to the one light source. Apart from these two ports, the ports may differ although both control circuits are identical.

In another preferred embodiment of the invention, the first and second control circuits are not identical. This means both control circuits comprise at least partially different software and/or hardware. However, the two control circuits may at least comprise the same input and output ports. Also, here it shall be understood that same input and output ports only means that both control circuits at least comprise one port for a connection to a bus lane to transmit and/or receive signals and at least one port to the one light source. Apart from these two ports, the ports may differ. If the control circuits are different, then the different software/hardware of one control circuit is at least adapted to perform the same functionality as the software/hardware of the other control circuit. It may be advantageously to have the two control circuits equipped with different software/hardware in case the failure is caused by environmental circumstances, which in case that both control circuits would be equipped equally, would lead again to the same failure if the same environmental circumstances are encountered, such a failure may be termed common cause failure. This can be prevented if the control circuits are equipped differently. In this scenario it is also possible that the control circuits are selectively enabled to operate in the drive mode based on the outer circumstances rather than based on detected failures.

In a further preferred embodiment of the invention, the drive mode operation means that the respective control circuit which is in the drive mode controls or regulates the power supplied to the one light source. In the drive mode, the control circuit may control or regulate the current or voltage applied to the one light source. The control or regulation of the power supplied may be done by ease of an adjustable current source and/or a pulse-width modulation, PWM, of the supplied voltage. The control or regulation exerted by the control circuit may be based on dynamic light information. The dynamic light information may comprise at least one of the following: the brightness of the light source, the colour of the light source, the switch ON/OFF time of the light source, a light pattern, if the light source is made out of several lighting elements, for example several LEDs, wherein the light pattern is a pattern to control or regulate the power supplied to each LED of the several LEDs individually.

Furthermore, the control circuit in the drive mode may additionally also diagnose the one light source and provide diagnostic information about the light source. By ease of this diagnostic information, a failure in the light source can be identified. The diagnostic information of the one light source may comprise a voltage drop measurement over the one light source or each element of the one light source. The diagnostic information of the one light source may alternatively or additionally comprise a current measurement. Optionally, the control circuit in the drive mode may also diagnose the other control circuit and its operation. The diagnose functionality may comprise a watchdog check, which checks whether the operation of the control circuit is performed in a timely manner. Furthermore, bus traffic of the control circuit may be diagnosed, e.g., whether the control circuit reacts upon bus traffic from the controller in the designated way or whether response times are within predetermined ranges. If the respective diagnosed control circuit is in the supply mode, it can also be assessed whether it provides power or whether the amount of power is sufficient. It shall be understood that the aforementioned list is not exclusive and also other diagnostics may be performed which indicate whether the control circuit operates under nominal conditions.

In a further preferred embodiment of the invention, the respective control circuit not in the drive mode may also be in a diagnose mode. When the respective control circuit is operating in the diagnose mode, the respective control circuit provides diagnostic information about the one light source and/or the other control circuit. The diagnostic information of the one light source may be the ones described above. The diagnose mode of the control circuit not driving the one light source provides another layer of safety, since the diagnostic information of this control circuit provides may be compared to the diagnostic information of the control circuit in the drive mode to safely identify failures of the one light source and/or the respective control circuits.

In a further preferred embodiment of the invention, the diagnostic information provided by the respective control circuits may be simple binary state information, one state indicating that the one light source and/or control circuit are operating under nominal conditions, i.e., no fault is detected, whereas the other state indicates that the one light source and/or control circuit is not operating under nominal conditions, i.e., a fault is detected. The binary state information may be provided as diagnostic information. If both, the one light source and the control circuit are diagnosed, two binary state information or one binary state information may be provided as diagnostic information. If one binary state information is provided for both diagnosed components, then this allows to quickly gain access to the health status of the system without producing overhead on the bus lane. In this case it is however necessary to run a further diagnostic to determine whether the fault was experienced by the one light source or the control circuit. In case that two binary state information are provided the further diagnostic is not necessary, but in this case the communication traffic is increased.

In a further preferred embodiment of the invention one of the first control circuit or the second control circuit is selectively enabled to operate in a supply mode to provide power to the one light source, wherein the power is controlled by the respective control circuit in the drive mode. In the supply mode, the control circuit can provide power to the one light source. Thereby, the amount of power applied to the light source may be controlled or regulated by the control circuit in the drive mode. As such, it can also be said that the control circuit which is in the supply mode provides a fixed potential, whereas the control circuit in the drive mode provides a variable potential. For example, both control circuits may be equipped with PWMs and the one light source may be connected in between the two PWMs. The PWM of the control circuit in the supply mode may connect the one light source to a power source and provide a fixed potential to the power source. This can for example be done by a 100% duty cycle of the PWM. The control circuit in the drive mode can connect the one light source to ground, GND, and may have a variable duty cycle. The variability in the duty cycle of the control circuit in the drive mode allows to control or regulate the power applied to the one light source. However, also other possibilities to control or regulate the power supplied by the control circuit not in the drive mode are contemplated. The aforementioned example as such shall not be understood to be limiting.

In a further preferred embodiment, the control circuits are not only adapted to perform diagnostic functions with respect to the one light source and the respective other control circuit, but also to perform self-diagnostics. The self-diagnostic is used to check whether all components of the control circuits operate under nominal conditions. The self-diagnostic can for example be run as an initial testing of the control circuit, for example when the one light source is switched ON. In case the light system is employed in a vehicle, the self-diagnostic can be run during the start of the vehicle together with other tests. The self-diagnostic can also be run based on a trigger, which can either be received by the controller or by the occurrence of a trigger event. Furthermore, it is also possible that the self-diagnostic is run periodically.

In a further preferred embodiment, each control circuit is adapted to perform measurements of the at least one light source for example a voltage drop measurement or a current measurement. The data gathered during the measurement present diagnostic information. This diagnostic information may be provided to a controller for performing further processing. This further processing may for example be a comparison with a threshold. If both control circuits provide diagnostic information, the controller may also compare the respective provided information. In the alternative, each control circuit may also itself process the measured data and provide diagnostic information about its processing. The diagnostic information in this case may be binary state information. For example, the control circuit may compare the measured voltage drop with a threshold and provide diagnostic information based on the comparison. Additionally, or alternatively also a current measurement may be compared to a threshold. In the latter case, the diagnostic information may be binary state information whether the threshold has been exceeded. The threshold may be stored in a memory of the respective control circuit, for example in an EEPROM. The threshold may include a to be expected noise level. The threshold may be pre-set in respective control circuits or may by dynamically adapted by the controller. Furthermore, the threshold may be gained during a calibration cycle of the respective control circuit. The control circuit which is operating in the diagnose mode—also the one which is in the drive mode and additionally performing diagnostic functions—may perform such measurements over each element of the one light source and provide the controller with diagnostic information. In case the light source is at least one LED, the control circuits may be adapted to measure a voltage drop over a given LED inclusive an optional serial resistor. The so measured voltage drop may then be compared to a threshold voltage including or excluding a noise value to derive the diagnostic information.

In a further preferred embodiment, the system comprises a bus lane. The bus lane allows at least communication between the control circuits and a controller. The bus lane may be bi-directional and allows the control circuits to receive signals from the controller and transmit signals to the controller. The bus lane can be one bus lane to which both control circuits are connected, and which allows a bi-directional signal exchange between the controller and the control circuits. In this example, the control circuits each may comprise a unique address, which can be used for communication. In the alternative, the bus lane may comprise several lanes, one of these several lanes connected to the first control circuit, another lane connected to the second control circuit. In the latter example, no addressing is necessary since each control circuit is connected to the controller via a separate lane. Nevertheless, both individual lanes together still may be regarded to form one bus lane.

The communication on the bus lane can be realized via electronic or optical signals. With these signals the drive mode of the control circuits can be enabled or disabled. Furthermore, the signals can also be used to enable or disable the diagnose mode and/or the supply mode. Furthermore, synchronization signals may be transmitted on the bus lane. In case the bus lane is adapted to support bi-directional communication, the control circuits can also transmit diagnostic information to the controller.

Depending upon the implementation of the bus lane, also communication between the control circuits themselves may be possible. In this case for example synchronization signals may be exchanged. Via these synchronization signals a synchronization between the control circuits can be achieved. The synchronization between the control circuits may comprise that the two control circuits are aware of the switching cycle of the one light source, e.g., the ON/OFF periods of the one light source, in order to synchronize the diagnose functions.

In a further preferred embodiment, the system comprises a synchronization lane between the control circuits. With this synchronization lane it is possible to transmit synchronization signals between the control circuits without putting any communication stress onto the bus lane. For this purpose, the synchronization lane may be separate to the bus lane. With this synchronization signal the diagnose operation of the two control circuits can be synchronized, such that the diagnostic information provided by both control circuits are comparable. The synchronization between the control circuits may comprise that the two control circuits are aware of the switching cycle of the one light source, e.g., the ON/OFF periods of the one light source, in order to synchronize the diagnose functions. If the synchronization signal is exchanged between the two control circuits, the synchronization signal may originate from the control circuit currently in the drive mode.

In a further preferred embodiment, the controller selectively enables/disables the drive mode using a control signal transmitted to the first control circuit and/or the second control circuit. The control signal may also be referred to as control command. The controller may be adapted to transmit a control command only to the one control circuit which shall operate in the drive mode. In this case both control circuits may from the beginning on operate only in the diagnose mode and only the one receiving the control command may switch to the drive mode operation. In the alternative, the controller may transmit the same control command to both control circuits and based on the address within the control command, the control circuits know which shall operate in the drive mode and which shall operate in the diagnose mode. This has the advantage that not two control commands have to be issued, one which would instruct the one control circuit to operate in the drive mode and one which instructs the other to operate in the diagnose mode. It shall however be encompassed that also the latter is possible.

In a further preferred embodiment, the controller selectively enables/disables the supply mode using a control signal transmitted to the first control circuit and/or the second control circuit. The control signal can be the same as the one used for enabling/disabling the drive mode or can be a separate one. In case it is the same one, it will include an information which control circuit shall enable/disable which mode of operation. If separate control signals are transmitted, then they can for example be of a different type, wherein the type indicated the enabling/disabling of a respective mode.

It shall be understood that both control circuits are adapted such that the drive mode and the supply mode can independently be enabled/disabled by control commands from the controller.

The issued control command may be based on diagnostic information received by the controller. The control circuits may both or at least one of the control circuits may diagnose the one light source and/or the respective other control circuit. The respective information may be transmitted to the controller via the bus lane and may be processed by the controller. Based on the processing the controller may then decide to switch the operational mode of the respective control circuit. For example, when the diagnostic information may indicate that the control circuit currently driving the one light source experiences a fault, the controller may decide to disable the drive mode in this respective control circuit and enable the drive mode of the other control circuit. The same also applies to the supply mode.

The control command may also be issued in from or as part of dynamic light information directed to the control circuits. Hence, the dynamic light information may control which control circuit operates in the drive mode and which operates in the diagnose mode. As such, the control command can also be referred to as enabling command.

It shall be understood that whenever in the forgoing it is described that an entity is adapted to perform a specific functionality then this entity possesses the respective means for performing this functionality.

The above-mentioned need is also fulfilled by a method of operating a light system by a controller, wherein the light system comprises one light source and two control circuits. The method comprises selecting one of the control circuits to operate in a drive mode for a given time. In the drive mode, the selected control circuit controls or regulates the power supplied to the one light source, whereas the other control circuit diagnoses the one light source and/or the respective control circuit operating in the drive mode. The control circuit to be selected to operate in the drive mode may also additionally diagnose the one light source and/or the other control circuit. The method may also comprise communicating with the two control circuits. The communication may comprise the exchange of control commands and information. With the control commands the controller may be able to direct which control circuit shall operate in which mode. The information may be diagnostic information captured by the control circuits and informing the controller about the status of the one light source and/or the control circuits themselves. Hence, the method may also comprise receiving diagnostic information from both or at least one of the control circuits and based on the diagnostic information change the mode of operation of one or both of the control circuits. This may for example be necessary if one of the diagnostic information indicates that a failure has occurred. Thereby, the received diagnostic information may be processed by the controller. If both control circuits provide diagnostic information then the method may comprise comparing the two diagnostic information to identify a failure. The method may also comprise comparing at least a portion of the diagnostic information with a threshold and if the threshold is exceeded, change the mode of operation of the control circuits. The method may also comprise periodically or based on an external command from a user or from a supervising controller to switch the mode of operation of the control circuits.

BRIEF DESCRIPTION OF THE DRAWINGS

In the following further advantages and details of the invention will become apparent from the detailed description of the figures. It shall be understood that none of the elements shown shall be regarded to be limiting and any software/hardware element or module which performs the respective described functionality shall be encompassed.

DETAILED DESCRIPTION

Figure 1:
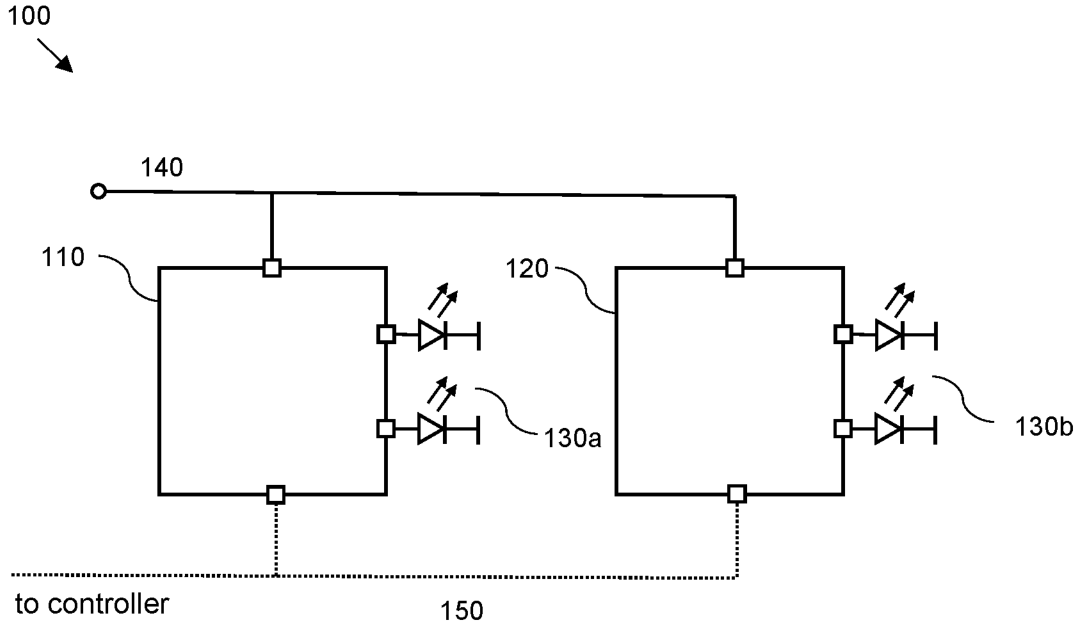
Fig. 1 (prior art)
FIG. 1 shows a schematic view of a light system according to the prior art.

FIG. 1 shows a light system 100 according to the prior art. The light system 100 comprises two control circuits 110 and 120 which each control their own light sources 130*a* and 130*b*. The control circuits 110 and 120 comprise hardware and/or software components, which allow the control circuits 110 and 120 to control the behaviour of the light sources 130*a* and 130*b*, for example, colour and/or brightness of the light sources 130*a* and 130*b*. In the here shown embodiment example, the control circuits 110 and 120 have identical hardware components, meaning the light system 100 is truly redundant, since control circuits 110 and 120 as well as light sources 130*a* and 130*b* are provided twice.

In the here shown embodiment example, each light source 130*a* and 130*b* is constituted by two light emitting diodes, LEDs. It shall be understood that although only two LEDs are shown, the light sources 130*a* and 130*b* may be constituted by any arbitrary number of LEDs and may take any arbitrary form of an LED cluster. Thereby, it can be referred to an LED cluster already when one or more LEDs are present. An LED cluster can also be referred to as an array of LEDs.

In the shown embodiment example, both control circuits 110 and 120 are connected to the same power source (not shown) via power supply lane 140. It shall be understood that although in the here shown embodiment example, the control circuits 110 and 120 are connected to the same power supply lane 140, the control circuits 110 and 120 may also be supplied individually with power.

Furthermore, in the here shown embodiment example, both control circuits 110 and 120 are connected to a controller (here not shown) via bus lane 150. The controller decides which of the redundant system is operating at any given time. Once a failure is detected, the respective other control circuit 110 or 120 takes the lead and operates its respective light source 130*a* or 130*b*. Hence, at any given time only one light source 130*a* or 130*b* is driven by the respective control circuit 110 or 120. However, this redundancy in the light system 100 has the drawback that two individual light sources 130*a* and 130*b* have to be installed, which may, due to space constraints, not always be easy to do. Furthermore, such redundant systems have the drawback of increased costs.

Apart from the increased costs and increased space consumption of such fully redundant systems, the light system 100 has also a drawback with regards to safety. If the control circuit 110 or 120 which at a given time is in the drive mode fails, but still provides power to the light source 130*a* or 130*b*, a switch OFF is not possible anymore. This could mean a light source 130*a* or 130*b* is still ON when it is supposed to be OFF, or the other way around. This may cause dangerous situations since the operator of a vehicle or system is presented with wrong information.

Figure 2A:
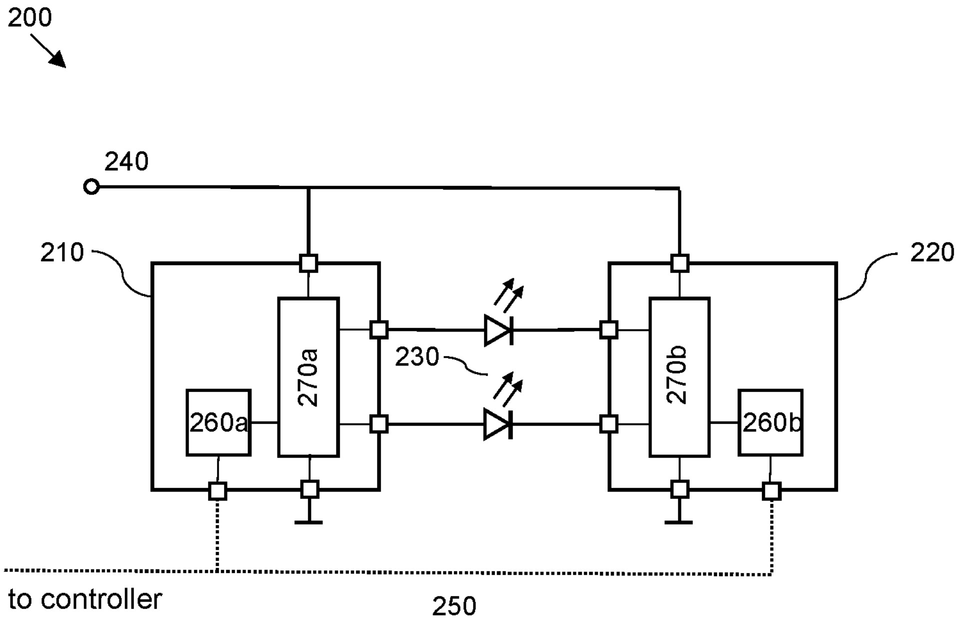
FIG. 2*a* shows a schematic view of an embodiment example of a light system according to the invention.

In order to prevent such situations in a redundant safety related light system according to the invention, a light system 200 according to FIG. 2*a* is presented. In the light system 200 only one light source 230 is present. This light source 230 is again constituted by two LEDs, but it shall be contemplated that any number of LEDs and/or any other implementation of a light source 230 is encompassed. The light source 230 is connected to control circuit 210 as well as control circuit 220. Hence, both control circuits 210 and 220 are able to equally drive the light source 230. In the here shown embodiment example, both control circuits 210 and 220 are connected to the same power source via supply line 240. Furthermore, both control circuits 210 and 220 are connected to the controller (here not shown) via bus lane 250. Via this bus lane 250, the control circuits 210 and 220 receive control commands from the controller with which the control circuits 210 and 220 are enabled to either operate in the drive mode, in which the respective control circuit 210 or 220 control or regulate the power supplied to the one light source 230, or to operate in a diagnose mode and/or in a supply mode, in which the respective control circuit 210 or 220 diagnoses the one light source 230 and/or the respective control circuit 210 or 220 provides power to the one light source 230. The controller may also be referred to as master or commander and the control circuits 210 and 220 may be referred to as slaves or responders, since they are controlled by the master or commander. The master can transmit the control commands which may also be referred to as control signals via the bus lane 250 to the control circuits 210 and 220. The bus lane 250 may also be used to transmit diagnostic information from one or both control circuits 210 and 220 to the controller. The diagnostic information may for example be binary state information, which inform the controller whether the control circuit 210 and/or 220 which is in the diagnose mode has detected a fault. In the alternative or additionally, the diagnostic information may comprise measurement data taken by the control circuits 210 and/or 220.

In the embodiment example shown in FIG. 2*a*, the control circuits 210 and 220 comprise similar hardware components, namely a microprocessor 260*a*, 260*b* and a PWM circuit 270*a*, 270*b*, which may also be simply referred to as PWM 270*a*, 270*b*. The microprocessors 260*a*, 260*b* control the behaviour of the respective control circuits 210 or 220. For example, the microprocessor 260*a*, 260*b* may receive a control command from the controller via bus lane 250 and enable the drive mode in the respective control circuit 210 or 220. When operating in the drive mode, the microprocessor 260*a*, 260*b* may operate the PWM circuit 270*a*, 270*b* to control or regulate the power applied to the one light source 230. For this purpose, the respective PWM circuits 270*a*, 270*b* comprise output ports to the LEDs of the light source 230. In the control circuit 210 or 220 not operating in the drive mode, the microprocessor 260*a*, 260*b* may operate the PWM circuit 270*a*, 270*b* to provide power to the one light source 230. For this purpose, the respective PWM circuits 270*a*, 270*b* also comprise output ports to the LEDs of the light source 230. Via the duty cycles of the PWM circuits 270*a*, 270*b* the power supplied to the one light source 23 can be controlled. This control is exerted by using the duty cycle of one PWM circuit 270*a*, 270*b* to respectively connect the one light source 230 to the power supply or ground, GND, wherein the amount of power running through the one light source is regulated or controlled by the duty cycle of the other PWM circuit 270*a*, 270*b*.

For example, the PWM 270*a* or 270*b* of the control circuit 210 or 220 not in the drive mode may be set to a duty cycle of 100%, i.e., the LEDs of the one light source 230 are constantly connected to the power source. It is clear to a person skilled in the art that this connection may also be achieved by ease of a switch or other means which are able to selectively connect the LEDs to the power source.

The PWM 270*a* or 270*b* of the control circuit 210 or 220 in the drive mode may be set to a duty cycle based on control signals received from the controller, e.g., in form of dynamic light information, in order to control or regulate the power supplied to the LEDs. Thereby, the PWMs 270*a* or 270*b* of the control circuit 210 or 220 in the drive mode connects the LEDs to ground, GND. It is clear to a person skilled in the art that this connection may also be achieved by ease of a switch or other means which are able to selectively connect the LEDs to ground, GND.

In an alternative operation, the PWM circuit 270*a* or 270*b* of the control circuit 210 or 220 which is not on the drive mode may be set to a duty cycle of 100% and connect the one light source to ground, GND, whereas the PWM 270*a* or 270*b* of the control circuit 210 or 220 which is in the drive mode may be set to a duty cycle based on control signals received from the controller and connect the one light source accordingly to the power source.

Since both control circuits 210 and 220 are equipped with a PWM circuit 270*a* and 270*b* which is selectively coupled to the power source and ground, GND, respectively, both control circuits 210 and 220 are able to either drive the one light source 230, meaning regulating the power supplied to the one light source 230, or supply the one light source with power.

The PWM circuits 270*a* and 270*b* may be controlled by the microprocessors 260*a*, 260*b* of the control circuits 210, 220. The microprocessors 260*a*, 260*b* may derive PWM ratios, duty cycles, and/or current settings from the control command. Furthermore, the microprocessor 260*a* and 260*b* may be adapted to control a measurement unit (here not shown), which is used to diagnose the one light source 230. The diagnose may for example be performed by measuring a voltage drop over the respective LEDs of the one light source 230. For this purpose, the measurement unit may comprise a multiplexer controlled by the microprocessors 260*a*/260*b* for selecting respective ports for the measurement. The measurement can for example be done in a differential way using ground, GND, as reference. The measurement unit may further comprise a voltage measurement block for signal scaling, e.g., amplification or division. Furthermore, the measurement unit may comprise a diagnose block for performing the measurements. It shall also be clear that this measurement unit may also measure other parameters as the voltage drop, for example the current applied to the one light source 230. Also not shown, it is clear to a person skilled in the art that such a measurement unit may be encompassed by all embodiments of the invention, in particular by all of the shown control circuits.

In the here shown embodiment example, the control circuits 210 and 220 are synchronized via the controller using the bus lane 250, for example by ease of synchronization signals. With this synchronization, it is possible to synchronize the operation of the control circuits 210 and 220. If for example the control circuit 220 receives from the controller a control command that control circuit 220 shall enable the drive mode and as such control or regulate the power supplied to the one light source 230, the other control circuit 210 may be in the diagnose mode. In order to synchronize the diagnose operation of the control circuit 210 with the drive operation of control circuit 220, the control circuit 220 may receive a synchronization signal via bus lane 250. This synchronization signal may comprise information about the drive cycle of the one light source 230, e.g., the ON/OFF period of the one light source 230, in order to correctly time the diagnose functions of the respective control circuit 210 and/or 220 which diagnoses the one light source 230 and/or the respective other control circuit 210 or 220. The synchronization between the control circuits 210 and 220 may also be useful to provide the controller with diagnostic information in a timely manner. Furthermore, in case that both control circuits 210 as well as 220 perform diagnostic functions, the performing of these functions need to be synchronized.

Figure 2B:
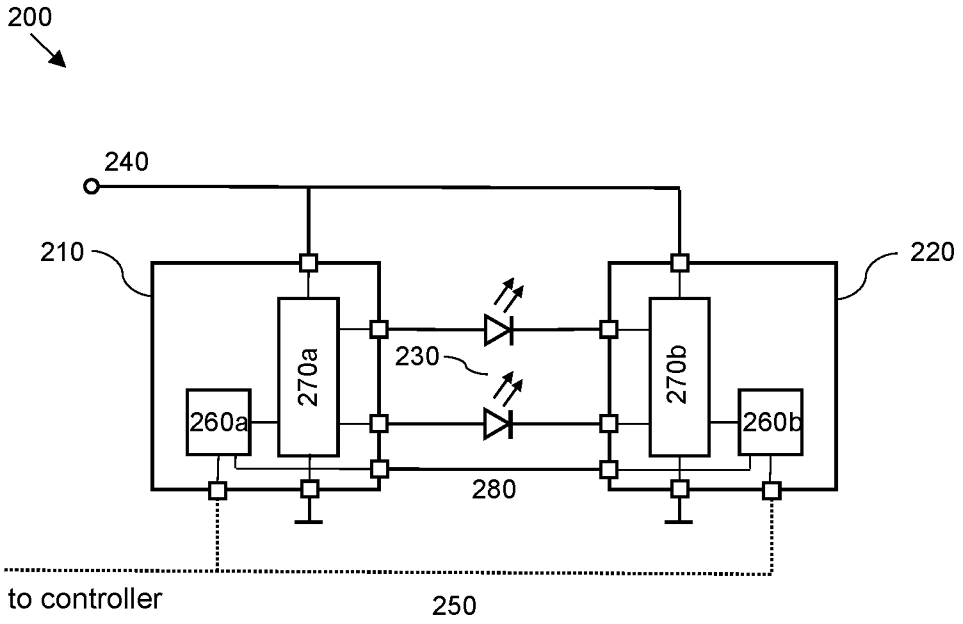
FIG. 2*b* shows a schematic view of an embodiment example of a light system according to the invention with a synchronization lane.

FIG. 2*b* shows the same light system 200 as shown in FIG. 2*a*, but with an additional synchronization lane 280 between the control circuit 210 and control circuit 220. In the here shown embodiment example, the synchronization lane 280 is between the microprocessors 260*a* and 260*b*. This shall however not be understood to be a limiting embodiment example, the synchronization lane 280 can be between any of the components of the control circuits 210 and 220 which are responsible for the operation of the respective control circuits 210 and 220. Via the synchronization lane 280 synchronization signals can be exchanged between the control circuits 210 and 220 in order to reduce the communication stress on the bus lane 250. The control circuit 210 or 220 which is in the drive mode will transmit a synchronization signal to the control circuit 210 or 220 which is in the diagnose mode, such that the diagnostic run by the control circuit 210 or 220 which is in the diagnose mode is synchronized to the control circuit 210 or 220 which is in the drive mode. For example, if control circuit 220 is in the drive mode, the PWM 270*b* of the control circuit 220 will have a specific duty cycle, which needs to be known to control circuit 210 in order to perform diagnostic functions at the right time. It can also be said that the control circuits 210 and 220 have by ease of the synchronization lane 280 a common timing, which not only supports the diagnostic functions, but also to transmit the diagnostic information to the controller via bus lane 250 at similar times, in order to make them comparable. It shall be contemplated that although the synchronization lane 280 is not shown in the following embodiment examples, this lane may be implemented in all of the respective embodiment examples.

Although in the here shown embodiment example, it is described that the respective control circuits 210 or 220 operate in the drive mode and supply mode, respectively, it is clear to a person skilled in the art that for having a further degree of flexibility and as further security measure both operational modes can also be performed by one control circuit 210 or 220 alone. This has for example the advantage that one control circuit 210 or 220 can take over the complete control of the one light source 230 in case the other control circuit 210 or 220 fails. For this purpose, the controller may set the drive mode and supply mode independently in each control circuit 210 and 220.

Figure 3:
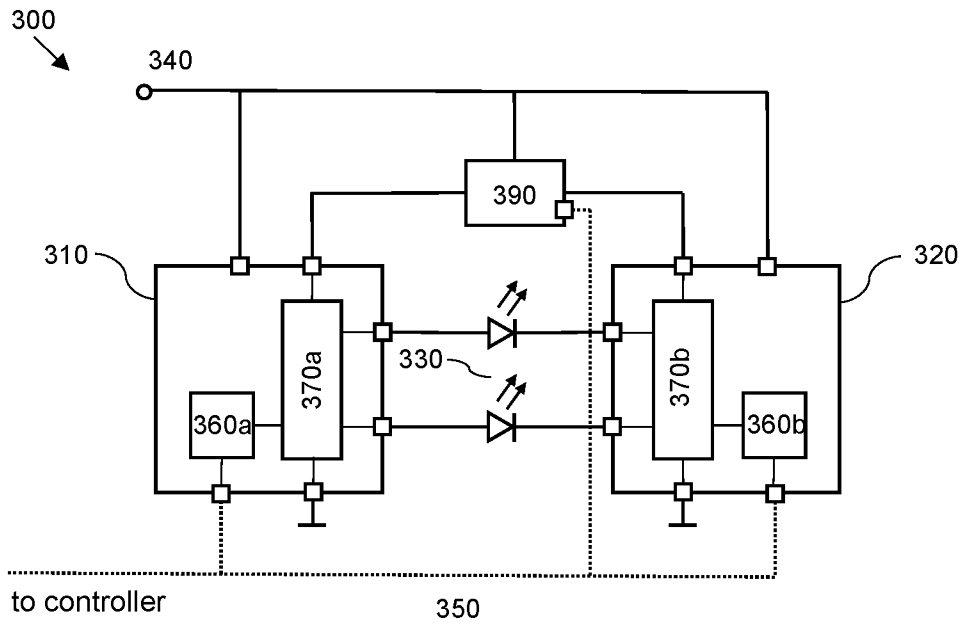
FIG. 3 shows a schematic view of another embodiment example of a light system according to the invention with a power distribution circuit.

FIG. 3 shows a similar embodiment example of a light system 300 as shown in FIG. 2*a*. Also here, two control circuits 310 and 320 are present, which are connected to one light source 330. The two control circuits 310 and 320 are also connected to a supply lane 340 as well as to a bus lane 350. Furthermore, both control circuits 310 and 320 comprise microprocessors 360*a*, 360*b* and PWM circuits 370*a*, 370*b*. The connection to the controller (here not shown) is realized via bus lane 350. In the embodiment example shown in FIG. 3, a switch circuit 390 is implemented in the supply lane 340. This switch circuit 390 is adapted to gate power for the one light source 330 to either the control circuit 310 or the control circuit 320. The switch circuit 390 may be controlled by the controller. In the here shown embodiment example, the switch circuit 390 is connected to the controller via bus lane 350. This shall however not to be understood as a limiting embodiment example. The switch circuit 390 may alternatively also be controlled by at least one of the control circuits 310 or 320. For example, the control circuit 310 or 320 which is in the drive mode may control the operation of the switch circuit 390.

The switch circuit 390 provides a means for completely switching OFF the power for the one light source 330 of one of the control circuits 310 or 320. For example, if control circuit 320 is enabled to operate in the drive mode, the switch circuit 390 may gate off the power for the one light source 330 of control circuit 320, since this control circuit 320 is in the drive mode and control circuit 310 is in the supply mode. As such, control circuit 320 only needs to control or regulate the power applied to the one light source 330 but not to be supplied itself with power for the one light source 330. Once the drive mode is disabled and the supply mode is enabled in control circuit 320, the switch circuit 390 may gate power to control circuit 320 and gate off power from control circuit 310.

When one control circuit 310 or 320 is in the drive mode and operates as well in the supply mode, the switch circuit 390 may also be adapted to gate power to the respective control circuit 310 or 320 and gate off the other control circuit 310 or 320.

Although switch circuit 390, in the here shown embodiment example, is depicted to be external to the two control circuits 310 and 320, it shall be contemplated that the switch circuit 390 can also be implemented within one control circuit 310 or 320 or its functionality may be split between the two control circuits 310 and 320.

With such a power distribution, the advantage can be achieved that a safety state of the one light source 330 can be maintained, e.g., the colour and brightness, even if one control circuit 310, 320 exhibits a fault or completely fails. Furthermore, the one light source 330 can be safely switched OFF, since the power supply of a failing control circuit 310 or 320 can be cut off, e.g., if a duty cycle setting of one of the PWM circuits 370*a* or 370*b* fails and cannot be set correctly anymore. In this case the respective control circuit 310 or 320 can no longer supply the one light source 330 with power and the respective other control circuit 310 or 320 can take over. It shall be understood that the switch circuit 390 as depicted in FIG. 3 can be implemented in different ways, in particular its functionality can be implemented in different ways, as for example depicted in FIGS. 4 and 5. These figures and implementations of the switch circuit's functionality shall however not be understood to be limiting and can also differently be implemented.

Figure 4:
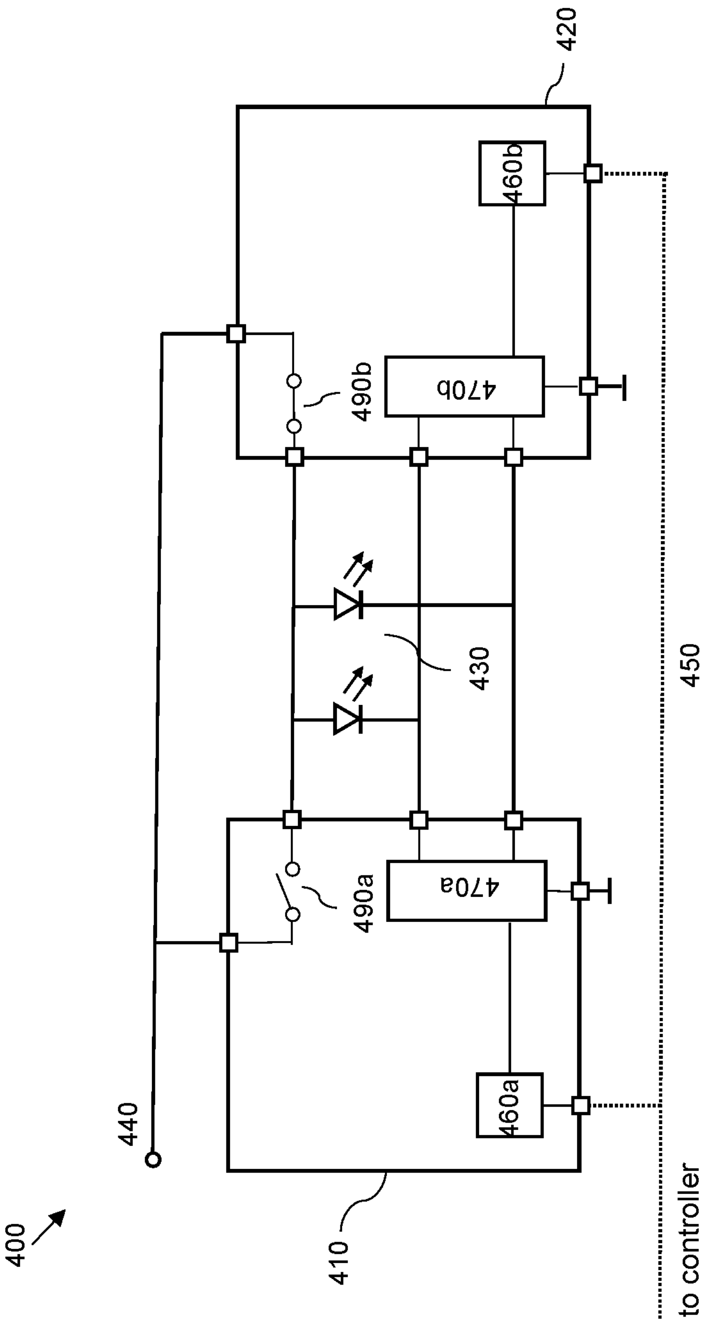
FIG. 4 shows a schematic view of another embodiment example of a light system according to the invention with a switch arrangement.

In FIG. 4 another embodiment example of a light system 400 is shown. Also here, two control circuits 410 and 420 are present, which are connected to one light source 430. The two control circuits 410 and 420 are also connected to a power supply lane 440 and a bus lane 450. Furthermore, both control circuits 410 and 420 comprise microprocessors 460*a*, 460*b* and PWM circuits 470*a*, 470*b*. The connection to the controller (here not shown) is realized via bus lane 450. In the here shown embodiment example, the two control circuits 410, 420 each comprise a switch 490*a* and 490*b* within the power supply of the one light source 430. With these switches 490*a*, 490*b*, the power supply to the one light source 430 can be controlled. In the here shown embodiment example, the control circuit 410 or 420 in which the switch 490*a* or 490*b* is closed operates in the supply mode, meaning this control circuit 410 or 420 supplies power to the one light source 430 from power supply lane 440, whereas the other control circuit 410 or 420 in which the switch 490*a* or 490*b* is open operates in the drive mode and as such regulates or controls the power applied to the one light source 430 The switches 490*a* and 490*b* also allow to completely gate off the one light source 430 from the power source in case one control circuit 410 or 420 fails and the other needs to take over.

In the shown embodiment example, the switch 490*b* of control circuit 420 is closed, whereas the switch 490*a* of control circuit 410 is open. Hence, the control circuit 420 is supplying the one light source 430 with power, whereas the control circuit 410 controls or regulates the power applied to the one light source 430. If control circuit 410 fails, control circuit 420 would take over the drive mode, in this case switch 490*b* would open and switch 490*a* would close in order to provide the one light source 430 with power. It shall be understood that this is only described as an illustrative example of the operations of the switches 490*a* and 490*b* and shall not be understood to be limiting. Whether the switches 490*a* and 490*b* are closed or open depends upon the distribution of the mode of operation of the respective control circuits 410 and 420. As described above, both control circuits 410 and 420 are adapted to independently have the drive and supply mode enabled.

The switches 490*a* and 490*b* itself can for example be implemented by transistors. These transistors may be p- or n-channel MOS transistors. In the here shown embodiment example, the switches 490*a* and 490*b* may be integral part of the control circuits 410 and 420, but they may also be external to the control circuits 410 and 420 much like the switch circuit 390 in FIG. 3.

Although the switches 490*a* and 490*b* control which control circuit 410 or 420 provides power to the one light source 430, still both control circuits are provided with power, such that both control circuits 410 and 420 may be operational at the same time. The switches 490*a* and 490*b* may be controlled by the microprocessors 460*a* and 460*b* of the respective control circuits 410 and 420. This control may be exerted based on a received control command from the controller. For example, in the here shown embodiment example, the controller may have selected control circuit 420 to supply the one light source 430 with power and control circuit 410 to be in the drive mode. In this case, the switch 490*b* would be driven to the close state, such that power can be supplied from the control circuit 420 to the one light source 430. The other control circuit 410 may have gotten information via the bus lane 450 that it shall operate in the drive mode. In this case the control circuit 410 would drive the switch 490*a* to the open state, such that no power is supplied to the one light source 430, but via the PWM 470*a* the power applied to the one light source 430 is controlled or regulated.

By ease of the switches 490*a* and 490*b*, the power source respectively the supply lane 440 can be disconnected by hardware from the one light source 430. This ensures that in a failure case, the one light source 430 is not erroneously provided with power and the control circuits 410 and 420 can switch operational modes.

Figure 5:
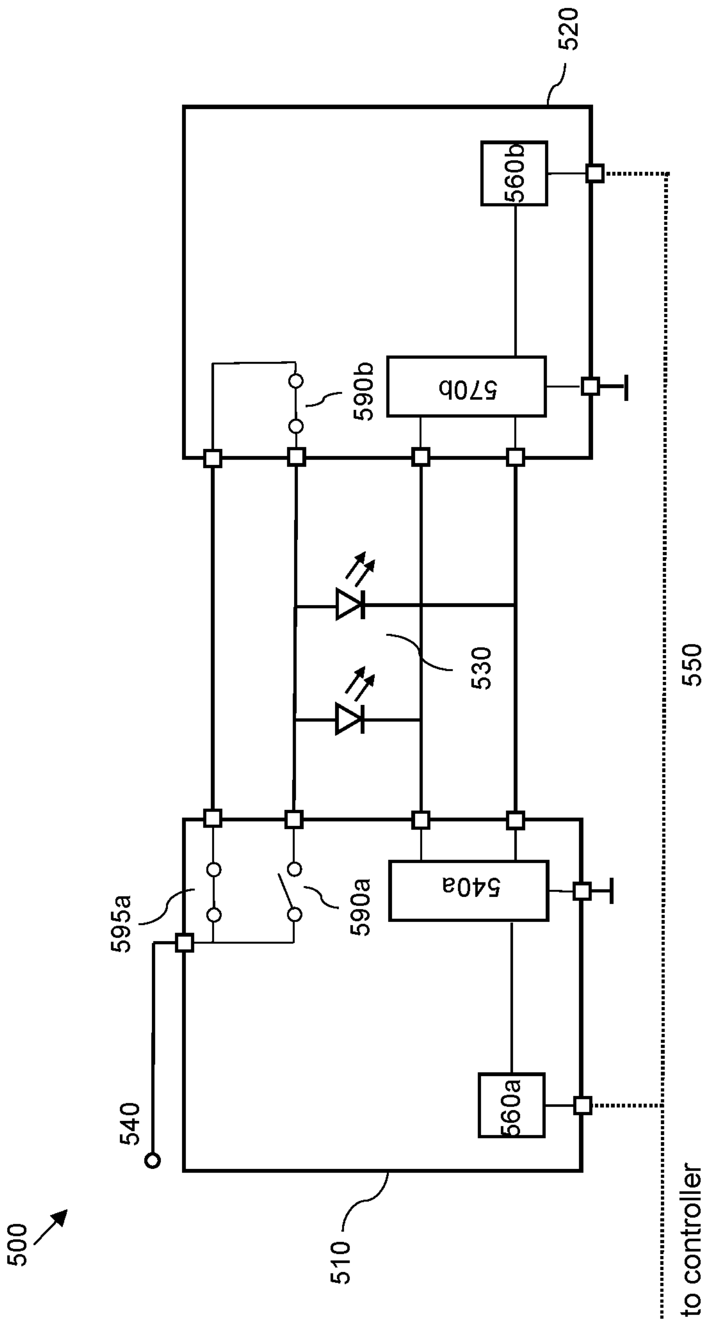
FIG. 5 shows a schematic view of another embodiment example of a light system according to the invention with another switch arrangement.

In FIG. 5 another embodiment example of a light system 500 is shown. Also here, two control circuits 510 and 520 are present, which are connected to one light source 530. The two control circuits 510 and 520 are also connected to a bus lane 550. Furthermore, both control circuits 510 and 530 comprise microprocessors 560*a*, 560*b* and PWM circuits 570*a*, 570*b*. The connection to the controller (here not shown) is realized via bus lane 550. In the here shown embodiment example, different to the ones shown in FIGS. 2 to 4, the two control circuits 510 and 520 are not separately connected to the power source (here not shown) via power supply lane 540, but only control circuit 510 is connected to the power supply lane 540. The control circuit 510 comprises two switches 590*a* and 595*a*. The switch 590*b* has the same functionality as described with regards to switch 490*b* of FIG. 4, namely, to allow control circuit 520 to provide power to the one light source 530. The other switch 595*a* in the here shown embodiment example is closed and allows the control circuit 510 to provide power to the control circuit 520. This means the power supply of the control circuit 520 is controlled by the control circuit 510, more precisely by switch 595*a*. In the here shown embodiment example, the switch 595*a* is closed, which means the control circuit 510 is supplying the control circuit 520 with power. Within the control circuit 520 switch 590*b* is closed, such that control circuit 520 provides power to the one light source 530. This in turn means, the control circuit 520 is in the supply mode and control circuit 510 is in the drive mode. As with the other embodiment examples described, this is only for illustrative purposes and shall not be understood to be limiting. The operational modes of the control circuits 510 and 520 may be reversed or even one control circuit 510 or 520 may be enabled to operate in the drive mode as well as in the supply mode. It is clear to a person skilled in the art that the operation of the switches 590*a*, 590*b*, 595*a* then must be adapted to the respective operational mode selection.

Furthermore, additionally both control circuits 510 and 520 may be in the diagnose mode in which they at least diagnose the one light source 530, but in which they may also diagnose the respect other control circuit 510 and 520.

If a failure is detected, e.g., the PWM circuit 570*b* of control circuit 520 does not operate under nominal conditions, the power supply to the control circuit 520 can be cut off by opening switch 595*a*, such that control circuit 520 is not able to erroneously provide the one light source 530 with power. In this case the control circuit 510 takes over and closes the switch 590*a* to be able to provide power to the one light source 530. As such, the control circuit 510 then also takes over the supply mode. Hence, the switch 595*a* provides a failsafe in case control circuit 520 fails, for example because switch 590*b* is not opening anymore and/or the PWM circuit 570*b* is malfunctioning.

The described switch operations of switches 590*a*, 590*b* and 595*a* may be caused by the microprocessors 560*a* and 560*b* of the control circuits 510 and 520, for example based on a control command from the controller. The controller may cause the switch operations to take place, if the controller receives diagnostic information, which indicate that a failure has occurred. It may however also be possible that the control circuit 510, which in the embodiment example of FIG. 5 is at first always in the drive mode, on its own performs the switch operation based on an identified failure of the light source 530 and/or the control circuit 520. In this case the control circuit 510 would disable the supply mode of control circuit 520 and take over the supply mode. This can be done by the control circuit 510 on its own motion, in order to save time in critical situations, where danger is immanent, if not an instant switch of the driving control circuit would be performed. The control circuit 510 may then after the switch has taken place inform the controller about the switch.

Although the embodiment examples shown in FIGS. 3 to 5 show the switch circuits arranged in the supply lane, it shall be contemplated that the same functionality can be achieved by arranging the respective switch circuits in the connection to ground, GND.

Although the embodiment examples are described in a manner that the second control circuit is in the supply mode and the first control circuit is in the drive mode, it shall be understood that this is only done for illustrative purposes and that the operational modes may also be reversed without departing from the scope of the invention. Furthermore, it is contemplated that both control circuits may additionally operate in a diagnose mode in which they at least diagnose the at least one light source and/or the respective other control circuit.

Although specific hardware elements are described herein, this shall not be understood to be limiting and the invention shall also encompass other hardware elements, which are able to provide the same functionality as the ones described herein.

The invention claimed is:

1. A safety related light system, the system comprising:
- one light source;
- a first control circuit;
- a second control circuit;
- wherein one of the first control circuit or the second control circuit is selectively enabled to operate in a drive mode to operate the one light source, wherein the respective control circuit in the drive mode is adapted to diagnose the one light source or the respective other control circuit and provide diagnostic information; and
- a controller adapted to selectively enable the first control circuit or the second control circuit to operate in the drive mode, wherein the controller is further adapted to selectively enable the respective control circuit not operating in the drive mode to operate in a diagnose mode.

2. The system according to claim 1, wherein the respective control circuit in the drive mode is adapted to control or regulate power supplied to the one light source.

3. The system according to claim 1, wherein the respective control circuit in the drive mode is adapted to receive dynamic light information for driving the one light source.

4. The system according to claim 3, wherein the dynamic light information comprises at least one of: a light pattern, brightness control, colour control, and an enabling command.

5. The system according to claim 1, wherein one of the first control circuit or the second control circuit is selectively enabled to operate in a supply mode to provide power to the one light source, wherein the power is controlled by the respective control circuit in the drive mode.

6. The system according to claim 1, wherein the respective control circuit not in the drive mode is adapted to diagnose the one light source and provide diagnostic information.

7. A safety related light system, the system comprising:
- one light source;
- a first control circuit;
- a second control circuit;
- wherein one of the first control circuit or the second control circuit is selectively enabled to operate in a drive mode to operate the one light source, wherein the respective control circuit in the drive mode is adapted to diagnose the one light source or the respective other control circuit and provide diagnostic information, and
- wherein each control circuit is adapted to perform a voltage drop measurement over the at least one light source, compare the measured voltage drop with a threshold and provide diagnostic information based on the comparison.

8. The system according to claim 1, further comprising:
- a bus lane for communication.

9. The system according to claim 1, wherein the respective control circuit in the drive mode is adapted to transmit a synchronization signal to the other control circuit.

10. The system according to claim 1, wherein the one light source is at least one light emitting diode (LED).

11. The system according to claim 1, wherein the controller selectively enables the drive mode based on a control command sent to the first control circuit or the second control circuit.

12. The system according to claim 11, wherein the control command is based on diagnostic information.

13. The system according to claim 1, wherein the respective control circuit in the drive mode is adapted to diagnose the one light source and provide diagnostic information.

14. The system according to claim 1, wherein the respective control circuit in the drive mode is adapted to diagnose the respective other control circuit and provide diagnostic information.

15. The system according to claim 3, wherein the dynamic light information comprises a light pattern command.

16. The system according to claim 3, wherein the dynamic light information comprises a brightness control command.

17. The system according to claim 1, wherein the respective control circuit not in the drive mode is adapted to diagnose the respective other control circuit and provide diagnostic information.

18. The system according to claim 1, wherein each control circuit is adapted to perform a voltage drop measurement over the at least one light source, compare the measured voltage drop with a threshold and provide diagnostic information based on the comparison.

19. The system according to claim 3, wherein the dynamic light information comprises a colour control command.

* * * * *